United States Patent [19]
Garcia et al.

[11] Patent Number: 5,576,905
[45] Date of Patent: Nov. 19, 1996

[54] SERVO CONTROL OF BI-DIRECTIONAL REEL-TO-REEL TAPE DRIVES USING FINE-LINE TACHOMETERS WITH INDEX LINES

[75] Inventors: Joe L. Garcia; Paul Y. Hu; John A. Koski, all of Tucson, Ariz.

[73] Assignee: International Business Machines Corporation, Armonk, N.Y.

[21] Appl. No.: 396,094

[22] Filed: Feb. 28, 1995

Related U.S. Application Data

[63] Continuation of Ser. No. 76,508, Jun. 14, 1993, abandoned.

[51] Int. Cl.⁶ ............................ G11B 15/54; G11B 15/67
[52] U.S. Cl. ............................ 360/73.14; 360/74.2
[58] Field of Search .................... 360/73.14, 74.2, 360/72.3, 71, 95, 77.12; 242/332.7, 332.8, 334.4

[56] References Cited

U.S. PATENT DOCUMENTS

| | | | |
|---|---|---|---|
| 3,834,648 | 9/1974 | Rose, Jr. et al. | 360/74.3 X |
| 3,854,676 | 12/1974 | Fischer et al. | |
| 3,900,732 | 8/1975 | Costales | 250/231 SE |
| 3,913,866 | 10/1975 | Hankins | |
| 4,015,799 | 4/1977 | Koski et al. | 242/334.4 |
| 4,102,028 | 7/1978 | Currie | 29/281.5 |
| 4,125,881 | 11/1978 | Eige et al. | 360/73.05 X |
| 4,234,899 | 11/1980 | Feldstein et al. | 360/73.03 |
| 4,295,171 | 10/1981 | Hirota et al. | |
| 4,333,115 | 6/1982 | Junio | 360/74.2 |
| 4,335,411 | 6/1982 | Dischert | |
| 4,343,992 | 8/1982 | Blaser | 250/231 SE |
| 4,370,683 | 1/1983 | Greig et al. | 360/73.08 |
| 4,398,227 | 8/1983 | Anderson | 360/71 |
| 4,479,159 | 10/1984 | Kamei et al. | 360/137 |
| 4,739,950 | 4/1988 | Goker et al. | 360/73.14 X |
| 4,776,528 | 10/1988 | West | 242/332.1 |
| 4,794,250 | 12/1988 | Togami | 250/231 SE |
| 4,809,099 | 2/1989 | Murphy et al. | 360/95 |
| 4,866,547 | 9/1989 | Rodal et al. | 360/74.2 |
| 4,953,044 | 8/1990 | Van Pelt et al. | 360/71 X |
| 5,085,379 | 2/1992 | Uchikoshi et al. | 360/73.14 X |
| 5,229,895 | 7/1993 | Schwarz et al. | 360/77.12 |

FOREIGN PATENT DOCUMENTS

| | | |
|---|---|---|
| 0392023 | 8/1989 | European Pat. Off. |
| 2391528 | 12/1978 | France |
| 2416060A1 | 10/1975 | Germany |
| 58-85957A | 5/1983 | Japan |
| 546931 | 3/1977 | U.S.S.R. |

OTHER PUBLICATIONS

J. A. Weidenhammer, "Electrical Differential Tape Drive System," IBM Technical Disclosure Bulletin, vol. 12, No. 11, Apr. 1970, p. 1805.

L. R. Beach and C. H. Kalthoff, "Reel-to-Reel Tape Transport," IBM Technical Disclosure Bulletin, vol. 15, No. 1, Jun. 1972, pp. 121–122.

*Primary Examiner*—Aristotelis Psitos
*Assistant Examiner*—James L. Habermehl
*Attorney, Agent, or Firm*—Baker, Maxham, Jester & Meador

[57] ABSTRACT

Air entrainment effects are avoided in a bi-directional, reel-to-reel tape transport in which magnetic tape can be moved in either of two opposing directions for data recording thereon. Control of tape position is implemented in a servo algorithm that uses tachometer inputs to determine parameter values for generating reel motor drive currents. A fine-line tachometer is mounted on each of two reels in the tape drive and multiplexing selects the fine-line output from the tachometer on the reel supplying tape for use in the servo algorithm. At least one of the tachometers is preferably of the type which generates an index line once each revolution of the motor to which it is mounted. This tachometer is coupled to the reel to which the tape is initially threaded and the index line is used to indicate that the motor is at a predetermined threading position for this operation.

11 Claims, 5 Drawing Sheets

SERVO CONTROL OF BI-DIRECTIONAL REEL-TO-REEL TAPE DRIVES USING FINE-LINE TACHOMETERS WITH INDEX LINES

This application is a continuation of application Ser. No. 08/076,508, filed Jun. 14, 1993, now abandoned.

BACKGROUND OF THE INVENTION

This invention relates to motion and positional control of magnetic tape in a reel-to-reel tape drive in which the magnetic tape can be transported bi-directionally for recording and playback of information in either tape direction.

The control of magnetic tape motion and position in reel-to-reel tape drives is described in detail in U.S. Pat. Nos. 4,015,799, and 4,125,881, both assigned to the assignee of this application and incorporated herein by reference in their entireties.

U. S. Pat. No. 4,015,799 relates to the use of a finely graduated ("fine line") tachometer on an idler roller engaging a magnetic tape to measure the amount of tape being advanced during a complete revolution of each tape reel shaft in a reel-to-reel tape drive system. The amount of tape advanced is converted to the radius of each reel once each revolution of each reel. Reel radius is then used to determine drive currents for each reel motor so as to provide a precise control of tape position and motion.

U.S. Pat. No. 4,125,881 describes a reel-to-reel tape drive in which magnetic tape is moved from one reel to another, passing a read/write head. A fine-line tachometer is mounted on one reel shaft to provide a fine-line tachometer reading in the form of a number of pulses per revolution. A second tachometer on the second reel shaft provides a single pulse per revolution of the second reel. The single pulse is used to gate the counting of fine-line tachometer pulses for each revolution of the second reel. A servo algorithm uses the gated per-revolution fine-line tachometer count to determine the reel radii based upon the actual length and thickness of the magnetic tape whose position and motion the servo system controls. Motor acceleration currents of a magnitude corresponding to the reel radii are generated to drive the reel motors.

Both of these incorporated patents are concerned with uni-directional tape drives in which magnetic tape is written and read in one direction. No recording occurs during movement of the tape in the opposite direction, which is used only for rewinding and repositioning the tape. However, in a bi-directional tape drive in which the magnetic tape can be recorded in either direction, the tape servo algorithm of the '881 patent cannot accurately determine the radius of the tape reel and position of data on the tape when the direction of tape writing is reversed.

The limitation in the servo algorithm of the '881 patent stems from air entrainment between the outermost layers of tape on the take-up reel. It has been determined that movement of the tape during writing creates a relatively thin air bearing between the undersurface of the portion of the tape traveling between the write/read location and the take-up reel. The air bearing is entrained in the outermost layers of tape on the take-up reel, being dissipated thereafter when the air trapped between layers of tape on the take-up reel escapes. This problem went unnoticed in the tape drive described in the '881 patent because the take-up reel provided only the index pulse during tape writing, with the fine-line tachometer pulses being provided from the supply reel. Since air is not entrained on the supply reel, fine-line pulses correlate very accurately with the radius of the tape remaining on the supply reel. However, if the write direction were reversed in the reel-to-reel drive of the '881 patent (assuming the drive to be reversible), the fine-line tachometer pulses now generated from the take-up reel would not correlate as accurately with the tape radius and tape position on the take-up reel. The loss in accuracy would significantly degrade tape drive operation when writing multiple data records separated by inter-block gaps.

While writing multiple data records at constant tape velocity, inter-block gaps (IBGs) between records are generated by timing the interval traveled between the records. This produces a well-controlled IBG whose size is determined by the tape speed and the time interval period. In order to maximize tape cartridge capacity, IBG size is minimized.

When the writing process stops due to an interruption of data available from a host system or a write data buffer, the tape drive must stop the tape and await the next write operation. Because of the very short length of the IBG and the relatively long stop and start distance required for the tape drive to accelerate, the tape drive motion servo system executes a "back hitch" in which tape motion is slowed following writing of the IBG, stopped, and then reversed back to a point where the write/read head precedes the location of the last-written data. When the writing process begins again, the tape is accelerated from its stop position up to the constant write velocity at which time the last data record and the IBG immediately following it have passed the write/read head and the next record is written.

In executing the back hitch operation, the position of the last-written data record on the tape relative to the write/read head is controlled by the tape motion servo system by using the output of a fine-line tachometer and by measuring timing between the end of the last-written data and a particular fine-line tachometer pulse. To start the back hitch, the data channel issues a synchronizing signal to the tape motion servo system indicating the end of the last data record. The tape motion servo system measures and stores the time lapse between this synchronizing signal and the next fine-line tachometer pulse which occurs (which becomes a position reference pulse). This time is subtracted from the desired IBG transit time to produce a time reference or partial IBG time for use in resynchronizing the recording channel circuits to the last data record on the tape. The fine-line tachometer pulses are counted for the purpose of locating the position reference pulse after the back hitch motion has been executed. When the position reference pulse is located, a write start point is achieved, and the tape motion servo system times out the remaining partial IBG time, issuing a resynchronizing signal to the data channel when the timeout completes. The resynchronizing signal thus occurs at the end of a nominal IBG distance from the previously-written data record, and a new data record is appended.

The accuracy of the process of resynchronization during the back hitch operation is limited by the integrity of the fine-line tachometer pulses. In particular, the correspondence between the fine-line tachometer pulses and the position of the data on the tape relative to the write/read head is dependent on the radius of the tape stack of the reel on which the fine-line tachometer is mounted. The tachometer pulses provide a measurement of the angular position of the reel which corresponds by radius to linear position of the tape. On the take-up reel, air entrainment increases the apparent radius of the tape stack, thereby compromising the integrity of the correspondence between the stack of tape on the reel and the reel hub. Therefore, the integrity of the correspondence between the fine-line tachometer pulse count and the radius of the tape stack is degraded if the fine-line tachometer output is obtained from the take-up reel. For very short IBGs, which are required to maximize data capacity, controlled IBG positioning must be accomplished with the supply reel. Thus, for a tape drive which writes in both directions, limiting the fine-line tachometer to only one reel, as taught in the '881 patent, introduces the potential for loss of data if the disparity between the actual and apparent tape stack radius is large enough.

The IBM 3480 tape drive product, which embodies the invention described and claimed in the '881 patent, is a reel-to-reel unit which utilizes a single-reel tape cartridge of a type described, for example, in co-pending U.S. patent application Ser. No. filed on Jun. 14, 1993 for "Magnetic Tape Cartridge with Second Generation Leader Block and Leader Block Pin" by G. S. M. Robles et al. which is incorporated herein by reference in its entirety. When the cartridge is initially loaded into the tape drive, it is placed in engagement with a tape drive reel. When the cartridge is loaded, a leader block mounted to, the tape's leading end is engaged by a threading mechanism which pulls the tape by the leader block around a threading path to a take-up reel which has a notch for receiving the leader block. During the threading process, the notch on the take-up reel must be precisely positioned at a point where the threading mechanism places the leader block into the notch. In the prior art IBM 3480 tape drive, two position sensors located on the take-up reel assembly detect and provide indication of the take-up reel position during threading. These two sensors are separate, non-integrated units which increase the expense and complexity of the reel-to-reel tape drive.

Manifestly, there is a need in a reversible reel-to-reel tape drive for solutions to the air entrainment problem and to the problem of precisely positioning the take-up reel during threading.

SUMMARY OF THE INVENTION

The invention provides a compound solution to these problems by placing a fine-line tachometer on each drive motor for each reel of a reversible reel-to-reel tape drive. Each tachometer may further include a single index line. In accordance with the invention, in response to a signal conditioned to indicate the direction of motion for writing the tape, a fine-line output is selected from the one of the tachometers fixed to the reel which is supplying the tape. When the direction in which data is being recorded or read is reversed, the roles of the tape reels reverse. Consequently, the invention provides for switching the source of the fine-line tachometer signal to the tachometer on the motor driving the reel which is now supplying the tape. The invention therefore eliminates the effect which air entrainment in the take-up reel may have on tape position control, without requiring expensive and complex mechanisms to eliminate air entrainment.

The problem of positioning the reel which receives the tape leader block during threading is solved by the provision of an index line on the tachometer on the motor which drives the reel. In the invention, once the threading notch is placed in the threading position, the tachometer is fixed to the shaft of the motor with its index mark at a known location, thereby providing a known correspondence between the index mark and the threading location, which enables a threading servo to position the reel during all subsequent threading operations.

Therefore the principal object of this invention is to provide an improved tape drive for a reversible reel-to-reel tape drive which can accurately control tape motion in both directions in a bi-directional reel-to-reel tape drive.

Another objective is to provide precise positioning of a tape drive reel for receiving the end of a tape in a threading operation.

A third objective is to achieve precise motion and position control of tape and tape reel components in a bi-directional, reel-to-reel tape drive by provision of fine-line tachometers on each of two reels, selection of a fine-line tachometer output from the reel which is currently supplying tape, and indication of the threading position in response to an index line on at least one of the tachometers.

The foregoing and other objects, features and advantages of the invention will become apparent from the following detailed description of the current embodiment thereof, as illustrated in the accompanying drawings.

DETAILED DESCRIPTION OF THE PREFERRED EMBODIMENT

Tape Motion Control

Tape motion control as used herein connotes the specific procedures and apparatuses described in incorporated U.S. Pat. No. 4,125,881 in which control of tape position and motion in a reel-to-reel tape drive is implemented by a tape radius constant corresponding to the actual length and thickness of the tape. The tape radius constant is calculated in a servo algorithm for controlling rotation of both reels in the tape drive. The inputs to the servo algorithm are tachometer pulses obtained from tachometers which engage reel motor drive shafts.

The invention is based upon the critical realization that deriving tape motion control parameter values using fine-line tachometer pulses obtained from a take-up reel fail to account for air entrainment in the outermost layers of tape on the take-up reel. The solution provided by the invention is to provide a fine-line tachometer on each motor drive shaft of a bi-directional reel-to-reel tape drive and to select fine-line tachometer pulses from the reel which supplies the tape during writing. Necessarily, the invention provides for switching from one tachometer to the other when the write direction is reversed.

Figure 1:
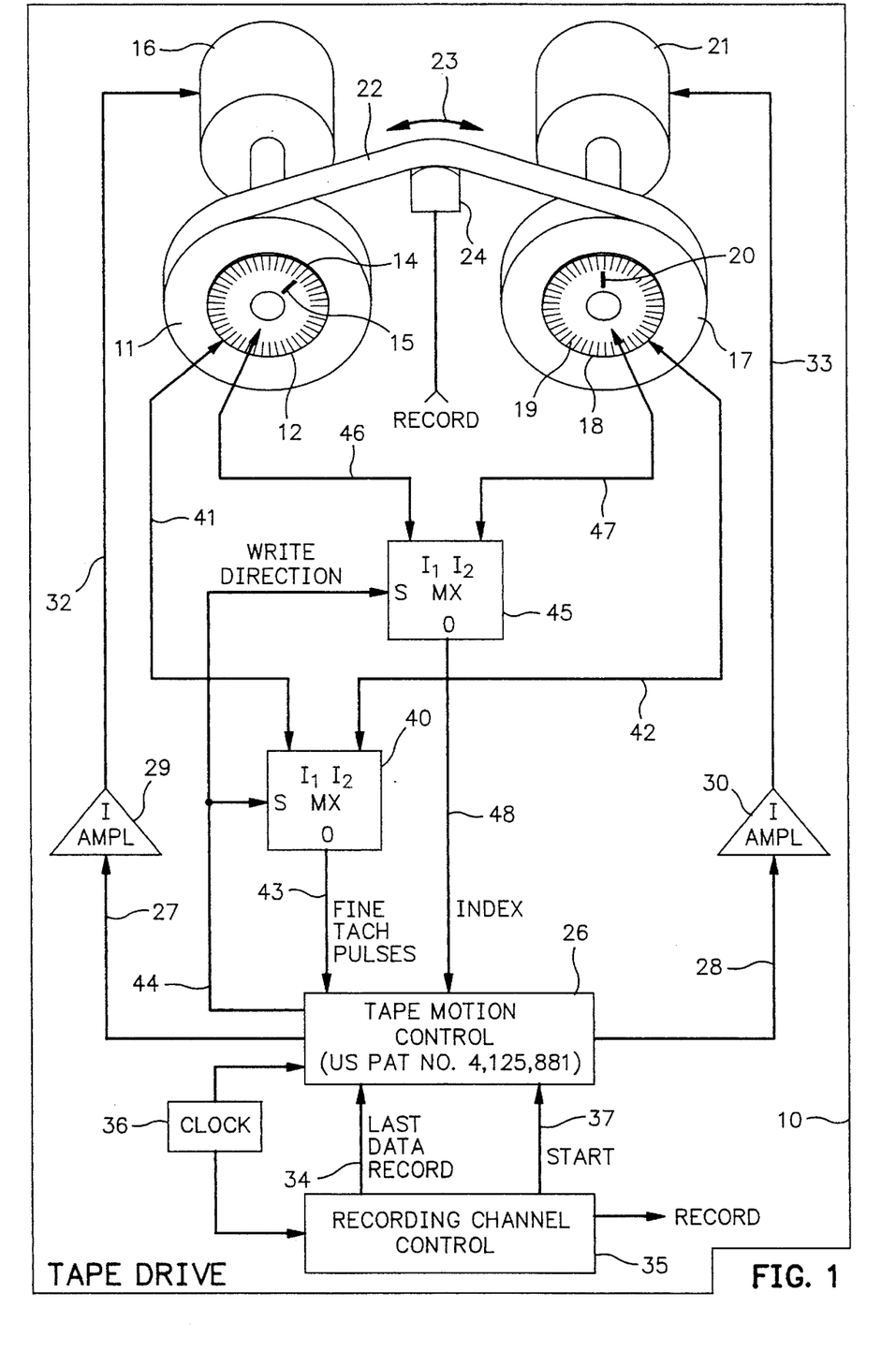
FIG. 1 is a logical schematic diagram showing a tape drive with a tape motion control unit according to the invention.

The invention can be understood with reference to FIG. 1 where a bi-directional reel-to-reel tape drive 10 includes a pair of reels 11, 17, each driven by a respective motor 16, 21. Mounted to the drive shaft of each of the motors 16 and 21, is a fine-line tachometer 12, 18, with an outer circular array of fine tachometer lines 14, 19, and an index line 15, 20 displaced radially inward on a respective coding wheel from the fine-line array. A tape 22 is wound to the reels 11, 17 and the motors 16, 21 are controlled to move the tape 22 for recording and playback in either of the two directions indicated by the arrow 23.

Each of the tachometers 12, 18, functions as a tape motion sensor; each emits a single pulse in response to an index mark to signify completion of a relatively large preselected angle, preferably 360°, that is, once per revolution of the reels 11, 17. In addition, each of the tachometers 12, 18 generates a two-phase fine tachometer signal comprising two phase-displaced pulse streams. The fine-line tachometer arrays on the tachometers 12, 18 are identical, each emitting N pulses during each revolution of respective reels 11, 17.

Assume that the tape 22 is being advanced from the reel 11 to the reel 17 for recording data through a magnetic write/read record head 24 positioned between the reels 11 and 17 in engagement with a recording surface of the tape 22. Relatedly, the reel 11 is the "supply" reel while the reel 17 is the "take-up" reel.

Assume now that a complete longitudinal track of data has been written on the tape 22 while the tape is being fed from the reel 11 to the reel 17. In order to continue recording without rewinding the tape, the direction of tape motion is reversed while recording continues, that is data is written while the tape is advanced from the reel 17 (which now becomes the supply reel) to the reel 11 (now, the take-up reel). Another complete longitudinal track of data, parallel to the first data track is written on the tape, and the tape motion is once again reversed, and so on.

During advancement of the tape 22, various parameters, such as tape motion, position, tension, are monitored in order to derive motor currents having the polarity and magnitude necessary to operate the motors 16, 21 while recording data on the tape 22. These currents are derived by the algorithm of the incorporated '881 patent in response to fine tachometer line and tachometer index signals which are fed to a tape motion control unit 26. The tape motion control unit 26 processes the fine tachometer and index pulses, generating currents for the motors 16 and 21 on respective current lines 27 and 28. The signals on the current lines 27 and 28 are amplified at 29 and 30, respectively, and amplified motor currents are conducted to the motors 16, 21 on the outputs 32, 33.

The tape motion control unit 26 operates to maintain the motors 16 and 21 at constant nominal velocities for recording, reading, and searching. In addition, the unit 26 controls the motors 16 and 21 to perform the back hitch operation described above in response to a signal indicating the last data record on signal line 34, which is provided by a recording channel control unit 35. Recording channel control unit 35 provides a RECORD signal for driving the magnetic write/read head 24 and also generates signals for synchronizing recording operations with tape motion, one of the signals indicating the writing of a last data record. A clock unit 36 provides clock pulses to the tape motion control unit 26 and the recording channel control unit 35 for synchronization of their operations.

During a back hitch operation, when the recording is interrupted, the motion of the tape 22 must be stopped to await the next record operation. When signal line 34 is activated, indicating that the last data record has been written, the control unit 26 operates the motors 16 and 21 to decelerate and stop the motion of the tape 22 and to move the tape in the reverse direction to a point where the tape is stopped to await the next record operation. As described in the '881 patent, clock pulses are counted from the beginning of the IBG until the first fine-line tachometer pulse occurs in the IBG which produces a timing reference between the end of the last data record and the fine-line tachometer pulse occurring in the IBG. This timing reference is employed to determine the end of the IBG by subtracting from the nominal IBG transit time. The result is the time from the fine-line tachometer pulse in the IBG to the end of the IBG, and it is used to generate the end of IBG signal 48, which resynchronizes the recording channel unit, 35, to the data previously recorded on tape. The tachometer pulse occurring in the IBG is referred to as the "position reference pulse" and it initiates counting of fine-line pulses during the repositioning of tape until tape has been stopped to await the next data record. Now, when the next data record is ready for recording, tape motion is started by provision of the START signal on 37 by the control unit 35. In response to the START signal, the control unit 26 provides motor drive currents to accelerate the tape 22 from its stopped position back through the IBG. When the end of the IBG is traversed, the control unit 26 provides a resynchronization signal to the control unit 35, which causes recording to start. The control unit 26 determines the location of the IBG during tape acceleration by counting down a fine-line tachometer pulse count which was accumulated from the location of the position reference pulse to the point where the tape was stopped and then timing by clock pulse count from the occurrence of the position reference pulse to the end of the IBG.

Manifestly, the relationship between fine-line tachometer pulse generation and tape position must be unchanging during the back hitch operation. Otherwise, the fine-line pulse countdown and clock pulse timeout to the end of the IBG will be incorrect. The relationship between tape position and tachometer fine-line pulse count is changed when entrained air bleeds out from between the outermost layers of tape on the take-up reel. In this regard, the take-up reel is that reel to which tape is advanced during a write operation, the designation remaining unchanged even during the back hitch operation. The invention is based upon the realization that the fine-line tachometer pulses can be obtained from the supply reel in a bi-directional reel-to-reel operation by multiplexing between the fine-line tachometer outputs in response to a signal indicating the direction in which the tape has advanced for recording. This is hereinafter referred to as the "write direction". This signal is produced by the tape motion control unit 26 and provided to the multiplexer 40. The multiplexer 40 receives the fine-line tachometer outputs from the tachometers 12, 18 on signal lines 41, 42, and selects a fine-line tachometer pulse stream in response to a WRITE DIRECTION signal produced by the tape motion control unit 26 on the signal line 44. The multiplexer 40 provides to the control unit 26 the fine-line tachometer signal produced by the tachometer on the supply reel as indicated by the WRITE DIRECTION signal.

An additional feature of the invention as described in greater detail below, incorporates an index line or mark in the tachometers 12 and 18. Each of the tachometers 12 and 18 is constructed and operated to provide both a fine-line and an index pulse output during revolution of the reels 11 and 17. For the aspect of the invention illustrated in FIG. 1, the provision of an index pulse on a tachometer is a convenience which eliminates the requirement to derive an index pulse for gating fine-line tachometer pulses by means of a second tachometer assembly for each of the reels 11 and 17. Accordingly, the tape motion control apparatus in the tape drive of FIG. 1 accommodates this convenience by a second multiplexer 45 which receives the index pulse outputs of the tachometers 12 and 18 on signal lines 46 and 47. The control mechanization of the multiplexer 45 is complementary to that of the multiplexer 40 in that the index pulse output is selected from the take-up reel as indicated by the WRITE DIRECTION signal. A fine-line tachometer pulse stream and an index pulse sequence are provided on signal lines 43 and 48 to the tape motion control unit 26, which employs them to operate the motors 16 and 21 as described in the incorporated '881 patent.

Tape Threading Using A Tachometer Index Pulse

The IBM 3480 tape drive receives a cartridge containing a single reel of wound tape. The tape cartridge includes a leader block attached to the end of the tape. When the cartridge is transported into the tape drive, the tape is threaded by a tape drive mechanism which engages the leader block and advances the tape in a threading operation to a take-up reel having a notch which receives the leader block. With the leader block received, the take-up reel rotates and the tape advances. The threading operation requires precise positioning of the take-up reel so that the leader block notch is oriented to receive the mechanism which advances the leader block. In the prior art 3480 tape drive, take-up reel positioning is implemented in an apparatus which employs two position sensors to position the take-up reel. The provision of a fine-line tachometer with an index pulse for tape motion control as described above led to the realization that threading position control could be very cheaply and easily implemented by initially aligning the index line on the fine-line tachometer with the required threading position on the take-up reel. In this regard, when a fine-line tachometer with an index mark is mounted to the motor that rotates the notched reel, the tachometer has its index mark prepositioned at a location which causes the tachometer to generate an index pulse. At the same time, the reel is rotated to the threading position and the tachometer is then attached to the motor shaft. Subsequently, when the motor is operated, each occurrence of the index pulse signifies that the reel has rotated to the threading position.

Figure 2:
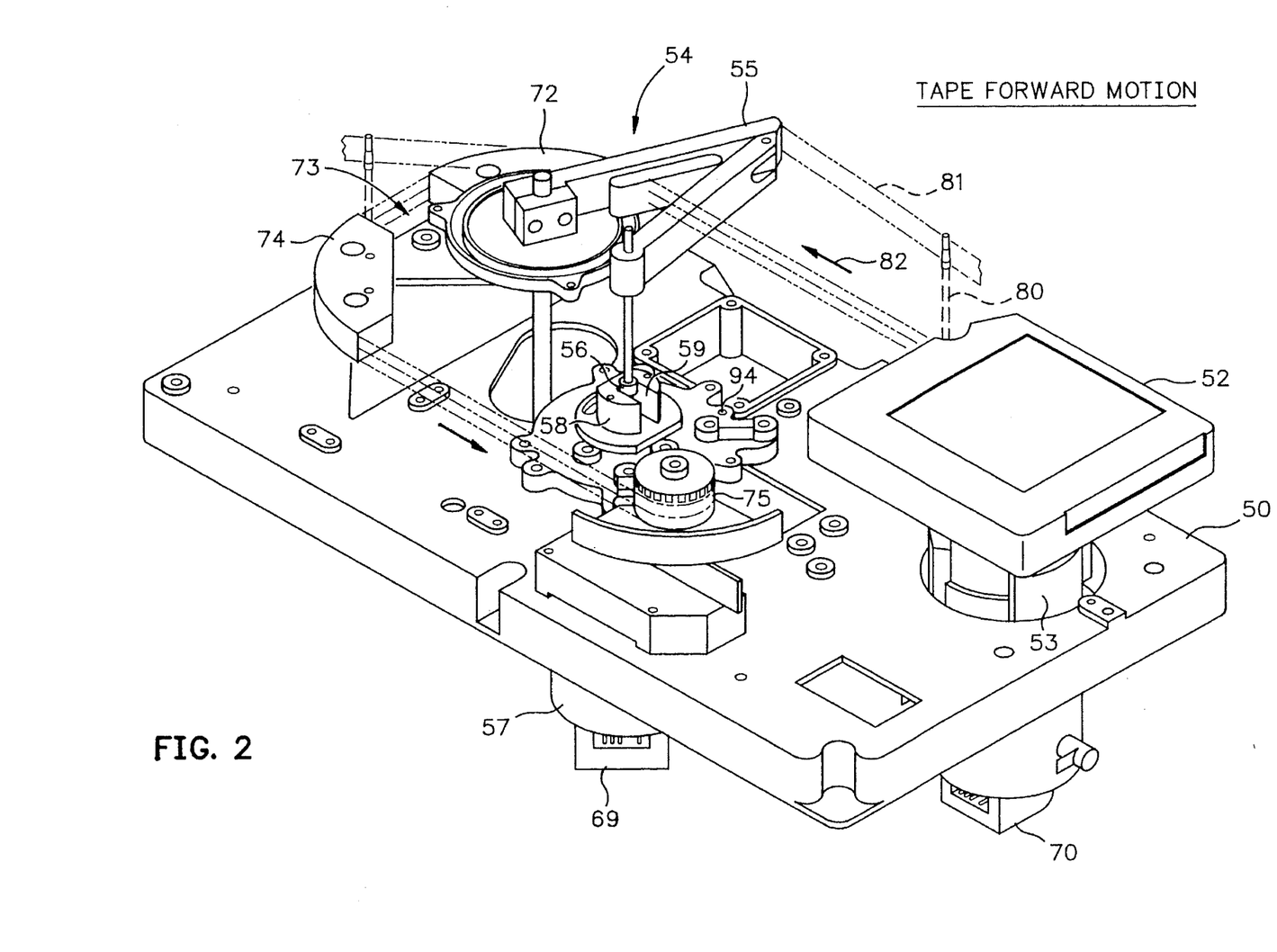
FIG. 2 is a perspective view of a tape transport assembly contained in the tape drive of FIG. 1.
Figure 3:
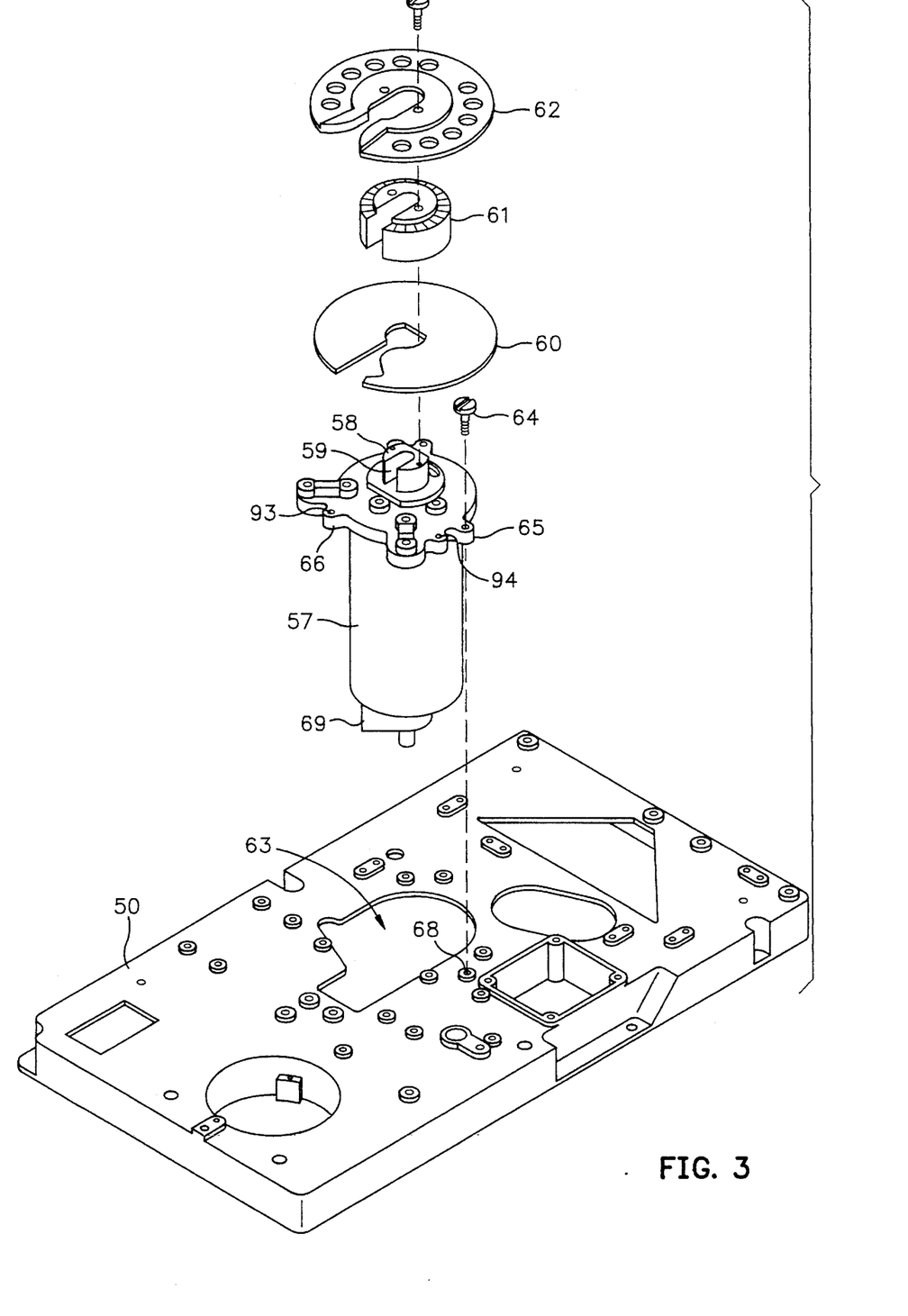
FIG. 3 is an exploded assembly diagram showing a take-up reel in the tape transport assembly of FIG. 2.

Refer now to FIGS. 2 and 3 which illustrate a tape advancing mechanism of the type embodied in the IBM 3480 tape drive. The mechanism includes a plate or deck 50 to which a supply reel is mounted on top of a supply reel motor 53. The tape loading mechanism (not shown) places a cartridge 52 containing a reel of tape with a leader block attached to the end of the tape (not shown) in engagement with the supply reel. A pantocam assembly 54 with an articulated arm 55 includes pin 56 at the end of the arm 55 for engaging the leader block after the cartridge 52 is loaded. The pin advances the leader block and with it, the tape, to a take-up reel assembly including a machine reel 58 mounted to the drive shaft of the take-up reel motor assembly 57. A notch 59 is provided in the machine reel 58 for receiving the leader block when the block is advanced to the threading position by the pantocam assembly 54. As best seen in FIG. 3, the take-up reel assembly includes a lower reel flange 60, a hub 61 mounted to the machine reel 58, and an upper flange 62. The flanges 60 and 62 and the hub 61 are all notched; when mounted to the machine reel 58, their notches are aligned with the leader block notch 59 and the machine reel 58. The machine reel is conventionally mounted on a drive shaft of the motor assembly 57 for rotation thereon. The take-up reel assembly is an integral unit which is mounted to the deck 50 by threaded machine screws, one of which is indicated by reference numeral 64. The threaded machine screws extend through holes in a motor adaptor plate 66 which is fixedly attached to the upper end of the motor 57. The threaded screws reach through motor plate assembly holes, one of which is indicated by reference numeral 65, and engage threaded recesses in the deck 50. One such threaded recess is indicated by reference numeral 68.

As disclosed above, fine-line tachometers 69 and 70 are respectively mounted to the motors 57 and 53. Each of the tachometers 69 and 70 is a fine-line tachometer with an index mark.

The threading path in the tape transport assembly is defined by curved tape guides 72 and 74 between which a magnetic write/read head (not illustrated) is mounted at position 73. Between the machine reel 58 and the curved tape guide 74, a tape is spindled at 75.

When the cartridge 52 is loaded, the pantocam assembly rotates, articulating the arm 55, until the pin 56 engages a leader block at 80. The pantocam assembly 54 then rotates in the opposite direction, articulating the arm 55 to advance the leader block in the direction indicated by the arrow 82. The pantocam assembly continues advancing the tape in this direction past the curved tape guide 72, the head location 73, the tape guide 74, and the spindle 75, and then into the notch 59 of the machine reel 58. It should be evident that the machine reel 58 must be rotated to place the notch 59 in the threading position illustrated in FIG. 2 prior to operation of the pantocam assembly 54. This is provided in the invention in response to an index mark in the tachometer 69.

Figure 5:
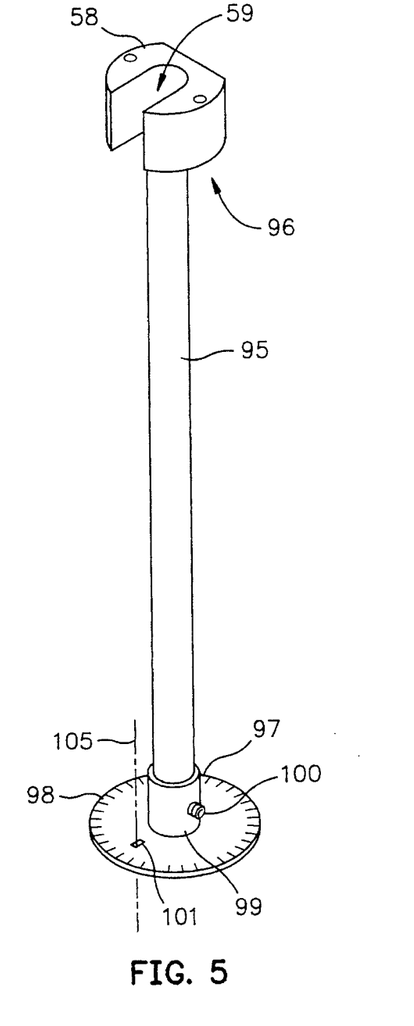
FIG. 5 illustrates alignment of a tachometer index mark with the leader block notch of FIG. 4.
Figure 6:
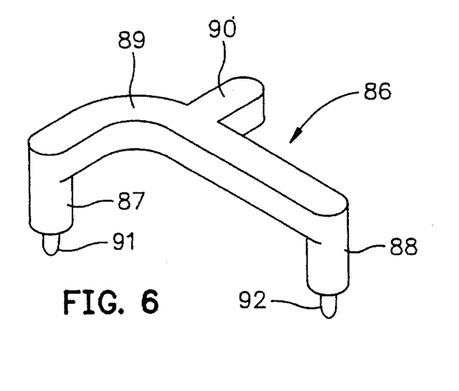
FIG. 6 is a side perspective view of the alignment tool illustrated in FIG. 4.
Figure 7:
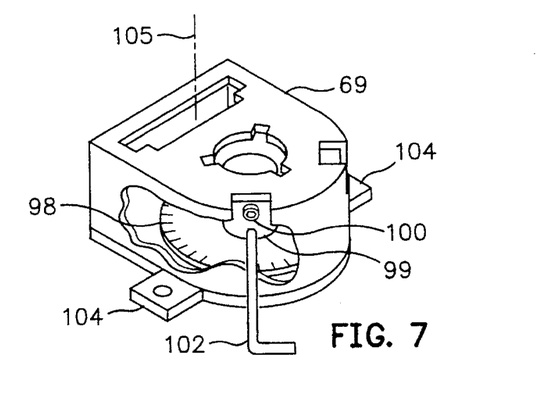
FIG. 7 is a side perspective view with a partial cutaway of a fine-line tachometer.

As inspection of FIG. 2 will show, the threading position is precisely defined by the location of the leader block notch with respect to the motor adaptor plate 66. In the invention, the tachometer 69 is attached to the drive shaft of the motor 57 on which the reel 59 rotates, with the index mark of the tachometer at a predetermined position. This is illustrated in FIGS. 5–7.

The invention uses an alignment tool 86 having a first tool leg 87, a second tool leg, and a connecting cross piece 89 extending between the legs 87 and 88. A notch engagement extension 90 juts out of the edge of the cross piece 89. Pins or extensions 91 and 92 are provided on the bottoms of the tool legs 87 and 88, respectively.

Figure 4:
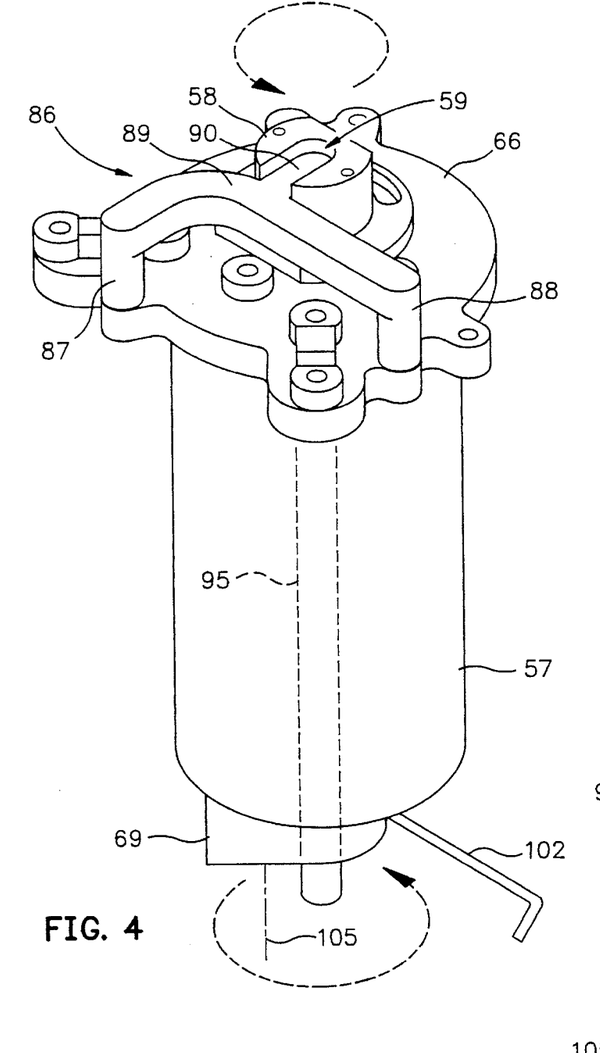
FIG. 4 is a side perspective view showing the take-up reel assembly of FIG. 3 in combination with an alignment tool for aligning a leader block notch at a threading position.

Use of the tool 86 is illustrated in FIG. 4. In FIG. 4, the tool 86 engages the machine reel 58, positioning it with respect to the motor adaptor plate 66 so that the leader block notch 59 is held in the threading position while the tachometer 69 is attached to the drive shaft 95 with the motor 57. In this regard, the pins 91 and 92 engage threaded recesses 93 and 94 on the motor adaptor plate 66, which places the notch engagement extension 90 of the tool 86 in the threading position occupied by a leader block during the threading operation. The machine reel 58 is manually rotated until the notch engagement extension 90 engages the leader block notch 59. When the extension 90 engages the notch 59, the shaft 95 is prevented from rotating from the threading position. The tachometer 69 is attached to the lower end 97 of the drive shaft 95.

Preferably, the tachometer 69 conforms essentially with an optical encoder of the kind described, for example, in U.S. Pat. No. 4,794,250, which is incorporated herein by reference. The '250 patent describes optical encoders available from the Hewlett Packard Company under model designation QEDS-5XXX. As known, the tachometer 69 includes a code wheel 98 with a hub 99. Optical encoders of this type currently provide both fine-line and index outputs. For example, the code wheel, which contains a circular array of fine line slots at its outer periphery, is also provided with an index slot made at a radial location between its center and the fine-line array. The tachometer assembly includes a conventional optical sensor/encoder which produces the continuous streams of fine tachometer pulses in response to rotation of the code wheel and index pulse once each revolution of the code wheel.

Continuing with the description of FIG. 4, a set screw 100 extends radially through the hub 99 and is tightened against the shaft 95 when two conditions are fulfilled. First, the shaft must be fixed with the reel 58 at the threading location. This condition is satisfied by use of the alignment tool 86. Second, the index mark 101 on the code wheel 98 must be rotated to a reference position at which the tachometer 69 generates the index pulse. When these conditions are satisfied, the tool 102 is used to tighten the set screw 100 against the shaft 95. Next, the tachometer assembly 69 is itself attached to the bottom of the take-up wheel motor assembly 57, preferably by threaded machine screws (not shown) which extend through flanges 104. When the tachometer 69 has been attached to the bottom of the motor 57 and the set screw 100 tightened against the drive shaft 95, the alignment tool 86 is disengaged from the take-up reel motor assembly 57 and the tool 102 is withdrawn from the tachometer assembly 69. The take-up reel motor assembly 57 is now received in the deck 50 through the opening 63 and attached to the deck as described above.

The adaptor plate 66 is fixed with respect to the reel 58 and is fixed to the deck 50 in a known relationship to the other tape transport components, including the pantocam assembly 54. Therefore, alignment of the notch 59 and the index line 101 with respect to the adaptor plate 66 as described above, ensures that the index line 101 will accurately generate an index pulse whenever the notch 59 is rotated to the threading position when the adaptor plate is mounted on the deck 50 as shown in FIGS. 2 and 3.

Assume now that the motor 57 is operating. During revolution of the motor 57, the tachometer 69 will emit two signals. First, a sequence of index pulses will be generated, each indicating one full revolution of the machine reel 58 and also traversal of the notch 59 through the threading position. Second, two streams of fine tachometer pulses will be generated; the pulse repetition rate of each stream indicates speed of motor rotation. The streams are offset by a predetermined phase amount to indicate direction of motor rotation. These signals are used in a servo loop illustrated in FIG. 8 to position the reel 58 for the threading operation.

Figure 8:
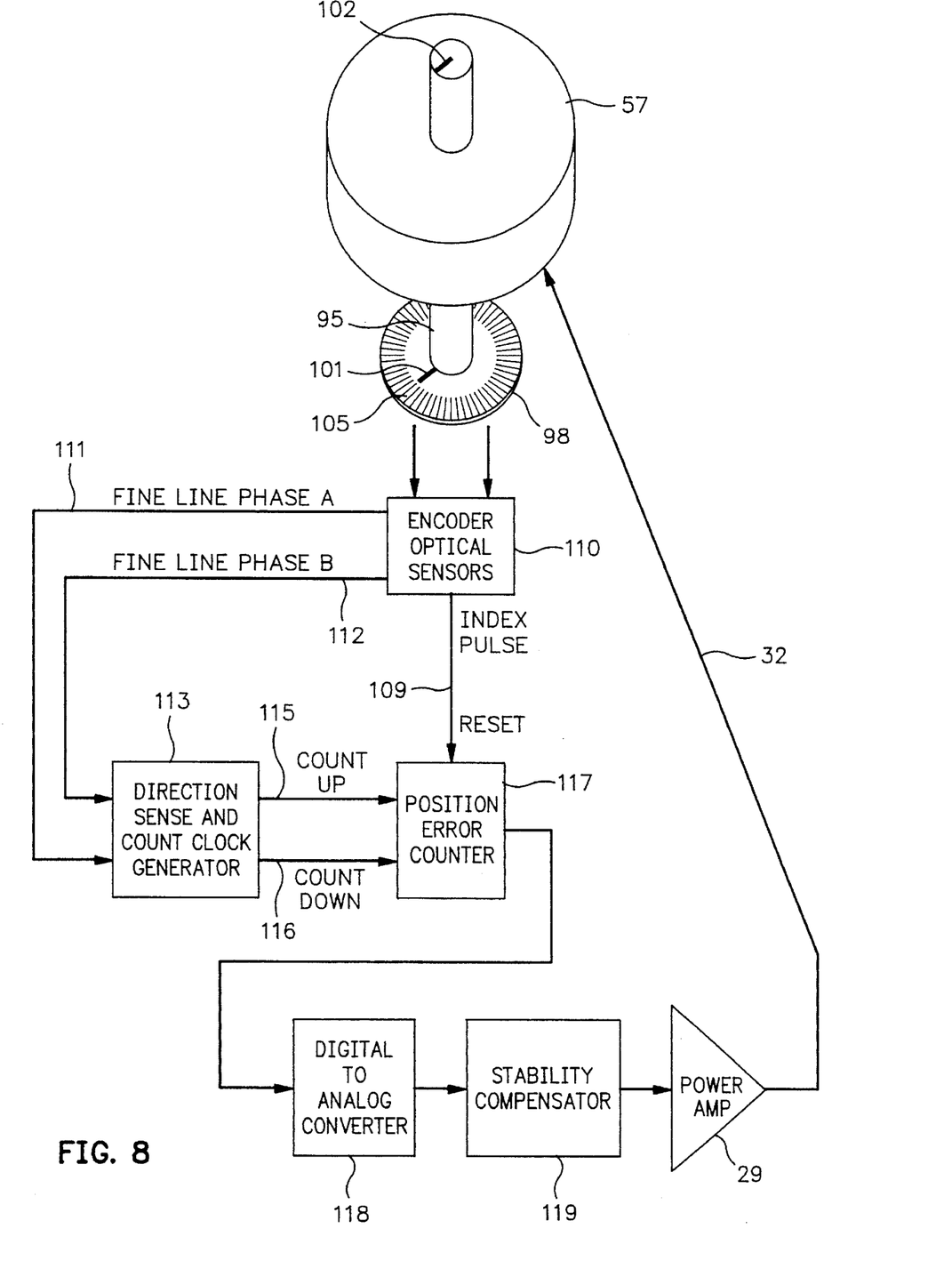
FIG. 8 is a schematic diagram showing the logical architecture of a tape threading position control apparatus according to the invention.

In FIG. 8, the drive shaft 95 which is part of the motor 57 is engaged at its bottom end by the code wheel 98. A mark 102 on the top end of the drive shaft 95 indicates the center of the leader block notch on the machine reel 58. The index slot 101 and fine-line slots 105 on the code wheel 98 are detected by encoder optical sensors 110 in the tachometer assembly 69 during a revolution of the shaft 95. The sensors 110 produce the index pulse on signal line 109 whenever the index line 101 is at the predetermined reference position in the tachometer 69. This event indicates that the center line 102 of the leader block notch is at the threading position. As the motor 57 rotates, the encoder optical sensors 110 also generate fine-line pulse streams (which are offset in phase) on signal lines 111 and 112. The relative phase between the sequences on the signal lines 111 and 112 and the pulse count are provided to a direction-sensing count clock generator 113. When the motor 57 rotates in one direction, the generator 113 provides an ascending count on signal line 115; when the motor rotates in the opposite direction, a descending count is provided on signal line 116. The ascending and descending count pulses are accumulated in the position error counter 117, whose count is reset upon each occurrence of the index pulse 109. The counter 117 outputs a signal in the form of a digital number which is converted by digital-to-analog converter 118 into a current signal compensated at 119 and amplified at 29. The amplified current signal is output on signal line 32 and drives the motor 57 in a direction corresponding to the magnitude of the amplified drive current.

The servo loop of FIG. 8 operates to seek a zero count in the counter 117. When the count is stable at a magnitude of zero, the index mark of 101 is stationary at the tachometer reference position, which indicates that the leader block notch is stationary at the threading position. In this regard, the loop rotates the motor 57, from any starting location and in either direction, until the notch in the reel 58 is at the threading location, which is indicated by the occurrence of the index pulse. At this point, the threading operation begins as described above.

Manifestly, the index line partitions the fine-line tachometer so that the phase difference between the fine-line pulse streams can be used to indicate ascending and descending counts. Relatedly, rotation in one direction from the index mark, indicated by one phase difference, can be deemed an ascending (or a descending) direction and each pulse in that direction can be used to increment (or decrement) a count.

While the invention has been particularly shown and described with reference to a preferred embodiment thereof, it will be understood by those skilled in the art that various changes in form or detail may be made therein without departing from the spirit, scope and teaching of the invention. For example, in the tape motion control apparatus illustrated in FIG. 1, index marks for gating fine-line tachometer pulses may derived by means other than index marks on the tachometer. In this regard, a separate optical encoder may be provided to signify a complete revolution of the drive shaft for each motor. Also, the tachometer code wheels have been disclosed with slots for generating tachometer pulses. Other optical or electromagnetic indicia may also be used with appropriate sensors to generate tachometer pulses. Accordingly, the detailed description given above is to be considered merely as illustrative and the invention is to be limited only as specified in the claims.

We claim:

1. An apparatus for controlling the motion of a magnetic tape in a tape drive, the apparatus including:

a first reel assembly for rotating in a first direction to supply a magnetic tape and for rotating in a second direction to take up the magnetic tape;

a second reel assembly for rotating in the first direction to take up magnetic tape supplied by the first reel assembly and for rotating in the second direction to supply magnetic tape to the first reel assembly;

a first fine-line tachometer coupled to the first reel assembly, said first fine-line tachometer comprising:

a first circular array of a plurality of fine tachometer lines to produce a first fine-line tachometer pulse stream comprising a plurality of first fine-line tachometer pulses generated each revolution of the first reel assembly; and a first index line to produce a first index pulse stream comprising a first index pulse generated once each revolution of the first reel assembly;

a second fine-line tachometer coupled to the second reel assembly, said first fine-line tachometer comprising:

a second circular array of a plurality of fine tachometer lines to produce a second fine-line tachometer pulse stream comprising a plurality of second fine-line tachometer pulses generated each revolution of the second reel assembly; and a second index line to produce a second index pulse stream comprising a second index pulse generated once each revolution of the second reel assembly;

a control unit providing at a control unit output a write direction signal indicating whether the first and second reel assemblies are rotating in the first direction or in the second direction; and a switch coupled to the first and second fine-line tachometers and the control unit output, said switch having a switch output, said switch providing at the switch output signals representative of the first fine-line tachometer pulse stream and the second index pulse stream exclusively when the write direction signal indicates that the first and second reel assemblies are rotating in the first direction, said switch providing at the switch output signals representative of the second fine-line tachometer pulse stream and the first index pulse stream exclusively when the write direction signal indicates that the first and second reel assemblies are rotating in the second direction.

2. The apparatus of claim 1, further including:

a tape engagement device on the first reel assembly for receiving an end of a magnetic tape at a threading location;

first index means coupled to the first reel assembly for generating an index signal when the tape engagement device is positioned at the threading location; and means in the control means and responsive to the index signal for rotating the first reel assembly to place the tape engagement device at the threading location.

3. The apparatus of claim 2, wherein each fine-line tachometer includes:

a rotatable code wheel with a circular array of fine tachometer indicia;

an index indicator in the code wheel; and sensor means responsive to rotation of the code wheel for generating a stream of fine tachometer pulses in response to the fine tachometer indicia and for generating a single index pulse once each rotation of the code wheel in response to the index indication.

4. An apparatus for controlling the motion of the magnetic tape in a tape drive, the apparatus including:

an engagement reel assembly comprising:

a machine reel defining a leader block receiving notch;

a drive shaft connected to the machine reel;

a motor connected to the drive shaft to rotate the drive shaft;

a motor plate stationarily positioned proximate the machine reel; and an alignment tool removably attachable to the motor plate in a predetermined attachment position, said alignment tool including a notch engagement extension positioned to engage the notch and hold the machine reel in a predetermined rotational position when the alignment tool is coupled to the motor plate and the machine reel is rotated to the predetermined rotational position relative to the extension;

a threading mechanism for advancing a leader block of a magnetic tape to the notch;

a rotatable first fine-line tachometer to generate a plurality of first fine-line tachometer pulses each rotation of said first fine-line tachometer;

a removable attachment device to selectively couple the first fine-line tachometer to the drive shaft;

means in the fine-line tachometer for generating an index signal when the first fine-line tachometer arrives at a predetermined rotational position; and control means for processing the first fine-line tachometer pulses when the first fineline tachometer is coupled to the drive shaft to sense rotation speed of the engagement reel assembly and to rotate the engagement reel assembly at one or more predetermined speeds until the index signal is generated to align the threading mechanism with the notch.

5. The apparatus of claim 4, further including:

the engagement reel assembly for rotating in a first direction to take up a magnetic tape and for rotating in a second direction to feed magnetic tape;

a cartridge reel assembly for rotating in the first direction to supply magnetic tape to the engagement reel assembly and for rotating in the second direction to take up magnetic tape from the engagement reel assembly;

a second fine-line tachometer coupled to the cartridge reel assembly to generate second fine-line tachometer pulses;

the control means coupled to the engagement and cartridge reel assemblies for rotating the engagement and cartridge reel assemblies in the first direction and the second direction for tape data recording in response to fine-line tachometer pulses; and means coupled to the fine-line tachometers and to the control unit for providing the second fine-line tachometer pulses in response to rotation of the engagement and cartridge reel assemblies in the first direction and for providing the first fine-line tachometer pulses in response to rotation of the engagement and cartridge reel assemblies in the second direction.

6. The apparatus of claim 5, further including:

first index means coupled to the engagement reel assembly for generating the index signal once each revolution of the engagement reel assembly;

second index means coupled to the cartridge reel assembly for generating an index signal once each revolution of the cartridge reel assembly; and control means coupled to the first and second fine-line tachometers and the first and second index means and being responsive to rotation of the engagement reel assembly and cartridge reel assembly in the first direction for providing an output representative of signals from the second index means, said control means also being responsive to rotation of the engagement reel assembly and cartridge reel assembly in the second direction for providing an output representative of signals from the first index means.

7. The apparatus of claim 6 wherein the fine-line tachometers each include:

a rotatable code wheel with fine tachometer indicia;

an index indicator in the code wheel; and sensor means responsive to rotation of the code wheel for generating a stream of fine tachometer pulses in response to the fine tachometer indicia and a single index pulse once each rotation of the code wheel in response to the index indicator.

8. The apparatus of claim 4, wherein the fine-line tachometer includes:

a rotatable code wheel with fine-line tachometer indicia;

an index slot in the rotatable code indicator; and sensor means responsive to rotation of the code wheel for generating a stream of fine tachometer pulses in response to the fine tachometer indicia and a single index pulse once each revolution of the code wheel in response to the index indicator.

9. A method for controlling the motion of a magnetic tape in a tape drive which includes a first reel assembly with a first fine-line tachometer and a second reel assembly with a second fine-line tachometer, the first fine-line tachometer including a first index means for generating an index pulse once each revolution of the first reel assembly and the second fine-line tachometer including a second index means for generating an index pulse once each revolution of the second reel assembly, the first reel assembly being rotatable in a first direction to supply magnetic tape and being rotatable in a second direction to take up magnetic tape, the second reel assembly being rotatable in the first direction to take up magnetic tape from the first reel assembly and being rotatable in the second direction to supply magnetic tape to the first reel assembly, the method including the steps of:

providing an output signal representative of signals from the first fine-line tachometer in response to rotation of the first and second reel assemblies in the first direction, and providing an output representative of signals from the second fine-line tachometer signal in response to rotation of the first and second reel assemblies in the second direction; and recording data on a magnetic tape wound on the first and second reel assemblies by rotating the first and second reel assemblies in response to the output signal;

providing an output signal representative of signals from the second index means exclusively during rotation of the first and second reel assemblies in the first direction, and providing an output representative of signals from the first index means exclusively during rotation of the first and second reel assemblies in the second direction; and gating fine tachometer pulses for controlling rotation of the first and second reel assemblies in response to the output signal.

10. A method for threading a magnetic tape in a tape drive including:

an engagement reel assembly, comprising:
a machine reel defining a leader block receiving notch;
a drive shall connected to the machine reel;
a motor connected to the drive shaft to rotate the drive shaft;
a motor plate stationarily positioned proximate the machine reel; and
an alignment tool removably attachable to the motor plate in a predetermined attachment position, said alignment tool including a notch engagement extension positioned to engage the notch and hold the machine reel in a predetermined rotational loading position when the machine reel is rotated to the loading position and the alignment tool is coupled to the motor plate;

a threading mechanism for advancing a tape leader of a magnetic tape to the notch;

a first fine-line tachometer to generate a plurality of first fine-line tachometer pulses responsive to rotation of the first fine-line tachometer and to generate an index signal when the first fine-line tachometer arrives at a selected rotational position; and a removable attaclunent device to selectively couple the first fine-line tachometer to the drive shaft;

said method comprising the steps of:
rotating the drive shaft until the machine reel arrives substantially at the loading position;
attaching the alignment tool to the motor plate in the attachment position, such that the notch engagement extension engages the notch and ensures that the machine reel is aligned in the loading position;
establishing the selected rotational position by rotationally aligning the tachometer with respect to the drive shaft and machine reel such that each of said index pulses is produced when the machine reel is positioned in the loading position;
engaging the attachment device to couple the tachometer to the drive shaft; and
removing the alignment tool from the motor plate.

11. The method of claim 10, further comprising the steps of threading the tape drive by performing steps comprising:

rotating the machine reel at one or more predetermined speeds while processing the first fine-line tachometer pulses to sense rotation speed of the machine reel;

aligning the machine reel in the predetermined loading position by terminating said rotation of the machine reel upon detection of the index pulse; and operating the threading mechanism to advance a tape leader of a magnetic tape to the notch.

* * * * *

UNITED STATES PATENT AND TRADEMARK OFFICE
CERTIFICATE OF CORRECTION

PATENT NO. : 5,576,905

DATED : November 19, 1996

INVENTOR(S) : Joe L. Garcia, et. al.

It is certified that error appears in the above-identified patent and that said Letters Patent is hereby corrected as shown below:

Title page, under Foreign Patent Documents, insert--
03-108149    11/96    Japanese --

Signed and Sealed this

Twenty-first Day of April, 1998

Attest:

BRUCE LEHMAN

Attesting Officer

Commissioner of Patents and Trademarks